(12) United States Patent
Van Tilburg et al.

(10) Patent No.: US 10,422,418 B2
(45) Date of Patent: Sep. 24, 2019

(54) TRANSMISSION ELEMENT AND TRANSMISSION PROVIDED WITH SUCH A TRANSMISSION ELEMENT

(71) Applicant: DRIVE TECHNOLOGY HOLLAND LTD., Best (NL)

(72) Inventors: Marinus Johannes Cornelis Van Tilburg, Sint-Oedenrode (NL); Henricus Josephus Maria Essens, Schijndel (NL); Johannes Constant Maria De Wijs, Hoogstraten (BE); Hubertus Hendrikes Adrianus Van Kasteren, Schijndel (NL)

(73) Assignee: DRIVE TECHNOLOGY HOLLAND LTD., AJ Eindhoven (NL)

( * ) Notice: Subject to any disclaimer, the term of this patent is extended or adjusted under 35 U.S.C. 154(b) by 252 days.

(21) Appl. No.: 15/542,231

(22) PCT Filed: Jan. 5, 2016

(86) PCT No.: PCT/NL2016/050003
§ 371 (c)(1),
(2) Date: Jul. 7, 2017

(87) PCT Pub. No.: WO2016/111620
PCT Pub. Date: Jul. 14, 2016

(65) Prior Publication Data
US 2017/0370450 A1    Dec. 28, 2017

(30) Foreign Application Priority Data
Jan. 7, 2015    (NL) ..................................... 2014092

(51) Int. Cl.
*F16H 9/24*    (2006.01)
*F16H 55/54*    (2006.01)
(Continued)

(52) U.S. Cl.
CPC ................. *F16H 9/24* (2013.01); *F16G 1/28* (2013.01); *F16H 55/171* (2013.01); *F16H 55/54* (2013.01)

(58) Field of Classification Search
CPC . F16G 13/04; F16G 5/18; F16G 13/06; B65G 17/08; B65G 2201/02
(Continued)

(56) References Cited

U.S. PATENT DOCUMENTS 270,723 A  *  1/1883  Aydelott ................. F16G 13/04
                                                    474/212
342,567 A  *  5/1886  Bernhardt ............... F16G 13/04
                                                    474/212

(Continued)

FOREIGN PATENT DOCUMENTS

DE         195 14 398 A1    10/1996

OTHER PUBLICATIONS

International Search Report for PCT/NL2016/050003 dated Jul. 5, 2016.

*Primary Examiner* — Henry Y Liu
(74) *Attorney, Agent, or Firm* — Shumaker, Loop & Kendrick, LLP

(57) ABSTRACT

A transmission element for a transmission such as a continuously variable transmission, including an elongate flexible endless carrier element provided with a number of receiving spaces with an opening and with a passage extending through the number of receiving spaces in the longitudinal direction of the carrier element, a number of engaging elements which are each received in a receiving space for movement between an active position and a passive position and which in the active position protrude further inward than in the passive position and at least out of the opening of this receiving space so as to be able to engage in the active position with a pulley of the transmission, and a spring (Continued)

element for providing resistance for each of the number of engaging elements during movement from the active position in the direction of the passive position.

10 Claims, 6 Drawing Sheets

(51) Int. Cl.
*F16G 1/28* (2006.01)
*F16H 55/17* (2006.01)

(58) Field of Classification Search
USPC .......................................................... 474/206
See application file for complete search history.

(56) References Cited

U.S. PATENT DOCUMENTS

| | | | | | |
|---|---|---|---|---|---|
| 499,961 | A * | 6/1893 | Brown | ............... | F16H 57/05 474/91 |
| 2,909,938 | A * | 10/1959 | Sharp | ............... | F16G 13/06 267/180 |
| 4,394,901 | A * | 7/1983 | Roinestad | ............... | B65G 17/068 198/850 |
| 4,473,365 | A * | 9/1984 | Lapeyre | ............... | B65G 17/08 198/850 |
| 4,832,187 | A * | 5/1989 | Lapeyre | ............... | B65G 17/08 198/834 |
| 4,854,925 | A * | 8/1989 | Chandrupatla | ............... | F16G 13/04 474/212 |
| 5,492,506 | A * | 2/1996 | Lorance | ............... | F16H 55/54 474/49 |
| 5,827,144 | A * | 10/1998 | Stevenson | ............... | F16G 5/18 474/201 |
| 5,938,553 | A * | 8/1999 | Ishida | ............... | F16G 13/06 474/208 |
| 6,663,523 | B1 * | 12/2003 | Chiuch | ............... | B21C 1/30 166/77.3 |
| 7,563,188 | B2 * | 7/2009 | Ozaki | ............... | B65G 17/08 198/779 |
| 7,648,435 | B2 * | 1/2010 | Ishida | ............... | F16G 5/166 474/8 |
| 7,874,952 | B2 * | 1/2011 | Tada | ............... | F16G 5/18 474/206 |
| 7,892,127 | B2 * | 2/2011 | Tada | ............... | F16G 13/06 474/206 |
| 7,896,766 | B2 * | 3/2011 | Mitzschke | ............... | B65G 17/086 198/850 |
| 7,922,614 | B2 * | 4/2011 | Ruzic | ............... | B65B 41/14 474/206 |
| 7,967,710 | B2 * | 6/2011 | Krause | ............... | F16G 5/18 474/206 |
| 8,016,706 | B2 * | 9/2011 | Junig | ............... | F16G 13/04 474/157 |
| 8,038,559 | B2 * | 10/2011 | Tada | ............... | F16G 5/18 474/155 |
| 8,057,341 | B2 * | 11/2011 | Penner | ............... | F16G 13/04 474/206 |
| 8,104,159 | B2 * | 1/2012 | Hattori | ............... | F16G 5/16 29/407.01 |
| 8,167,751 | B2 * | 5/2012 | Gramby | ............... | B65G 17/064 198/848 |
| 8,506,433 | B2 * | 8/2013 | Miura | ............... | F16H 9/18 474/46 |
| 8,585,015 | B2 * | 11/2013 | Aoki | ............... | B66F 3/06 254/1 |
| 8,636,611 | B2 * | 1/2014 | Kamamoto | ............... | F16G 5/18 474/244 |
| 8,801,555 | B2 * | 8/2014 | Aoyama | ............... | F16G 5/16 474/242 |
| 9,028,350 | B2 * | 5/2015 | Cho | ............... | F16H 55/54 474/47 |
| 2002/0123402 | A1 * | 9/2002 | Mott | ............... | F16G 1/24 474/148 |
| 2011/0059821 | A1 * | 3/2011 | Lee | ............... | F16H 9/10 474/8 |
| 2015/0183585 | A1 * | 7/2015 | Menke | ............... | B65G 17/08 198/853 |
| 2015/0292935 | A1 * | 10/2015 | Kleczewski | ............... | G01G 19/035 177/145 |

* cited by examiner

TRANSMISSION ELEMENT AND TRANSMISSION PROVIDED WITH SUCH A TRANSMISSION ELEMENT

TECHNICAL FIELD AND BACKGROUND OF THE INVENTION

The present invention relates according to a first aspect to a transmission element for a transmission, such as a continuously variable transmission provided with pulleys.

According to a second aspect, the present invention relates to a transmission provided with such a transmission element.

Such a pulley for a transmission is disclosed in U.S. Pat. No. 5,492,506. The pulley has contact blocks which are reciprocally movable radially to a limited extent between two discs. The contact blocks define the running radius of a transmission element in the form of a toothed belt trained round the pulley. The contact blocks have a tooth profile for form-locked engagement with the toothed belt. A drawback of this known pulley is that the running radius of the pulley can in practice only be varied to a limited extent in co-action with said toothed belt. This limits the range of application.

BRIEF SUMMARY OF THE INVENTION

An object of the present invention is to provide a transmission element for realizing particularly form-locked transmission of force in simple and reliable manner in a transmission with a transmission ratio of the transmission which is changeable in continuously variable manner in a relatively wide range.

The object is achieved with the transmission element according to the invention, for a transmission such as a continuously variable transmission provided with at least two pulleys, configured to be trained in mounted situation around the at least two pulleys of the transmission in order to thus enable transmission of drive force during operation from a first to a second of the at least two pulleys, the transmission element comprising:
  an elongate flexible endless carrier element provided at regular pitch in a longitudinal direction thereof with a number of receiving spaces, wherein each of the number of receiving spaces is provided with an opening on the inner side of the carrier element facing in operation toward a pulley of the at least two pulleys, wherein the carrier element has a passage extending through the number of receiving spaces in the longitudinal direction of the carrier element,
  a number of engaging elements which are each received in a receiving space of the number of receiving spaces for movement substantially at right angles to the longitudinal direction between an active position and a passive position and which in the active position protrude further inward than in the passive position and at least out of the opening of this receiving space so as to be able to engage in the active position with a pulley of the at least two pulleys of the transmission, and wherein each of the number of engaging elements is provided with a passage at least partially in line with the passage in the carrier element,
  an endless spring element extending through the passage in the carrier element and through the passage of each of the number of engaging elements, wherein the spring element is configured to provide, for each of the number of engaging elements, resistance from spring action of the spring element during movement of the respective engaging element from the active position in the direction of the passive position.

Providing movable engaging elements in an endless flexible carrier element makes it possible to provide the engaging elements at a fixed pitch wherein co-action is possible with a pulley provided with contact elements which have a toothing and which can be moved radially. With engaging elements in the active position the transmission element thus functions as a toothed belt. During operation it is possible at a determined radial position of the contact elements that not all contact elements over which the transmission element is trained can engage with engaging elements of the transmission element, because they are as it were out of phase with each other. Achieved in this respect with the transmission element according to the invention is that these engaging elements, which in operation would come into conflicting contact with teeth of a contact element because of this being out of phase, move toward the passive position when they come into contact and are thus inactive and do not therefore form a form-locked contact with the pulley. The form-locked transmission of force is however guaranteed by other of the engaging elements which, in the active position, are in engagement with the pulley.

The transmission element according to the invention is therefore particularly configured for a transmission further provided with a number of contact elements for contact with the transmission element which are distributed around the rotation axis of a respective pulley of the at least two pulleys, which contact elements define a running radius at which the transmission element is trained round the associated pulley, wherein each of the number of contact elements is provided on the outer side thereof facing toward the transmission element with at least one, preferably a number of engaging elements, such as teeth, provided at a regular pitch relative to each other.

In the transmission element according to the invention each of the engaging elements thus protrudes out of the opening in the active position, and in the passive position either lies inside the carrier element or, while it does protrude from the opening, it protrudes less far than in the active position.

The carrier element is preferably provided at regular pitch in the longitudinal direction thereof with a number of further receiving spaces, wherein each of the number of further receiving spaces is provided with a further opening on the inner side of the carrier element facing toward the pulley during use, wherein in a transverse direction of the carrier element transversely of the longitudinal direction of the carrier element a receiving space and a further receiving space are provided adjacently of each other in each case, wherein each of the number of respective engaging elements is received in a receiving space of the number of receiving spaces and the further receiving space of the number of further receiving spaces provided adjacently thereof. Because the respective engaging elements are received in two mutually adjacent receiving spaces, relatively large engaging elements can be provided in the transmission element using relatively small receiving spaces. Small receiving spaces are advantageous in limiting mechanical weakening of the carrier element, wherein relatively large engaging elements are advantageous in transmission of the drive force.

It is favourable here for the carrier element to have a further passage extending in the carrier element through the number of further receiving spaces in the longitudinal direction of the carrier element, and wherein each of the number of engaging elements is provided with a further passage which is at least partially in line with the further passage in the carrier element, the carrier element further comprising a further endless spring element which extends through the further passage in the carrier element and through each of the further passages of the respective engaging elements, wherein the further spring element is configured to provide, for each of the number of engaging elements, resistance from spring action of the spring element during movement of the respective engaging element from the active position in the direction of the passive position. A more reliable spring action is obtained by providing a further spring element, wherein the spring action can be increased.

It is advantageous for an endless strengthening element, configured to increase the resistance to elongation of the carrier element, to be provided in the carrier element in the longitudinal direction of the carrier element. Owing to the greater resistance of the carrier element to elongation a possible elongation of the carrier element during transmission of a drive force is largely prevented, whereby the pitch between the engaging elements remains the same, or remains at least substantially the same in the case of a varying drive force to be transmitted. A pitch between the engaging elements which is as uniform as possible is advantageous in realizing a uniform transmission of force.

It is favourable for the spring element and/or the further spring element extending through the endless passage to be formed as an endless hollow cord, wherein the cavity is filled with a fluid. Such a cord is favourable in realizing a desired spring force.

The carrier element is preferably formed in longitudinal direction by a number of successive interconnected carrier elements. Transmission elements of different length can in this way be realized, wherein the transmission element has an equal pitch between the engaging elements along the whole length thereof.

It is advantageous here for the carrier element to be manufactured from a material comprising rubber. Such a material is favourable for the flexibility of the carrier element in order to be able to provide the transmission element around at least two pulleys.

It is advantageous here when the carrier elements are vulcanized to each other in connected state. A durable connection is hereby obtainable which results in a carrier element with increased resistance to wear.

The passage and/or the further passage of each of the number of engaging elements is preferably a through-hole. In this embodiment of the engaging elements the engaging elements enclose the spring element, whereby a locking of the engaging elements in the carrier element is realized. An active tracking of the engaging element with the spring element is hereby also realized.

The invention further relates to a transmission, comprising a transmission element according to the invention, a first pulley rotatable about a first rotation axis and a second pulley rotatable about a second rotation axis, wherein the transmission element is trained round both the first pulley and the second pulley so as to thus enable transmission of drive force from the first pulley to the second during operation, at least one of the first and second pulleys comprising a number of contact elements for contact with the transmission element which are distributed around the rotation axis of the associated pulley, which contact elements define a running radius at which the transmission element is trained round the associated pulley, wherein each of the number of contact elements is provided on the outer side thereof facing toward the transmission element with at least one, preferably with a number of engaging elements, such as teeth, provided at a regular pitch relative to each other for the purpose of engaging with one or more engaging elements lying in the active position thereof of the number of engaging elements of the transmission element during operation, and moving means for moving the contact elements reciprocally in radial direction, and preferably comprising a radial guide for each of the contact elements along which the respective contact elements are movable radially in reciprocal manner between an inner radial position and an outer radial position, wherein the moving means are configured to move the contact elements reciprocally in radial direction between the inner and the outer position. Advantages of the transmission according to the invention are similar to the above stated advantages of the transmission element according to the invention.

BRIEF DESCRIPTION OF THE DRAWINGS

The present invention will be elucidated hereinbelow on the basis of the description of a preferred embodiment of a transmission element according to the invention with reference to the following schematic figures, in which.

DETAILED DESCRIPTION OF THE INVENTION

Figure 1:
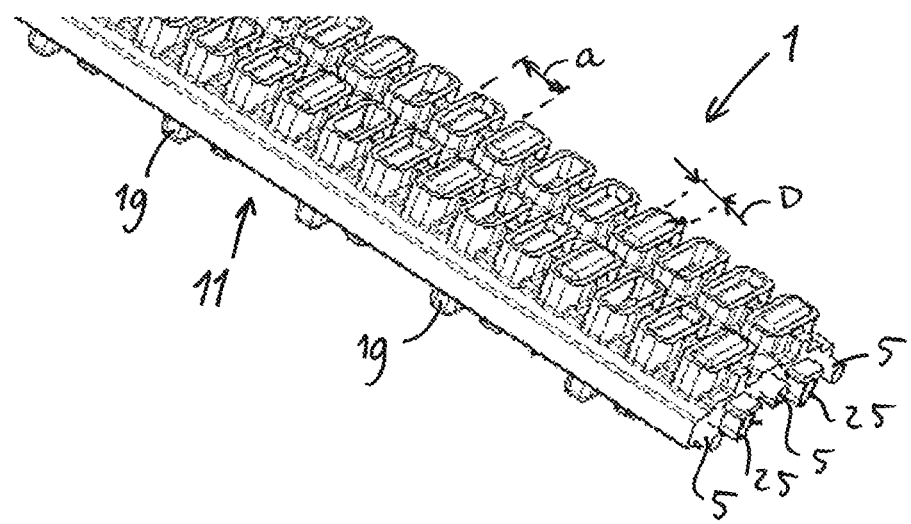
FIG. 1 is an isometric view of a part of a preferred embodiment of a transmission element according to the present invention.
Figure 2:
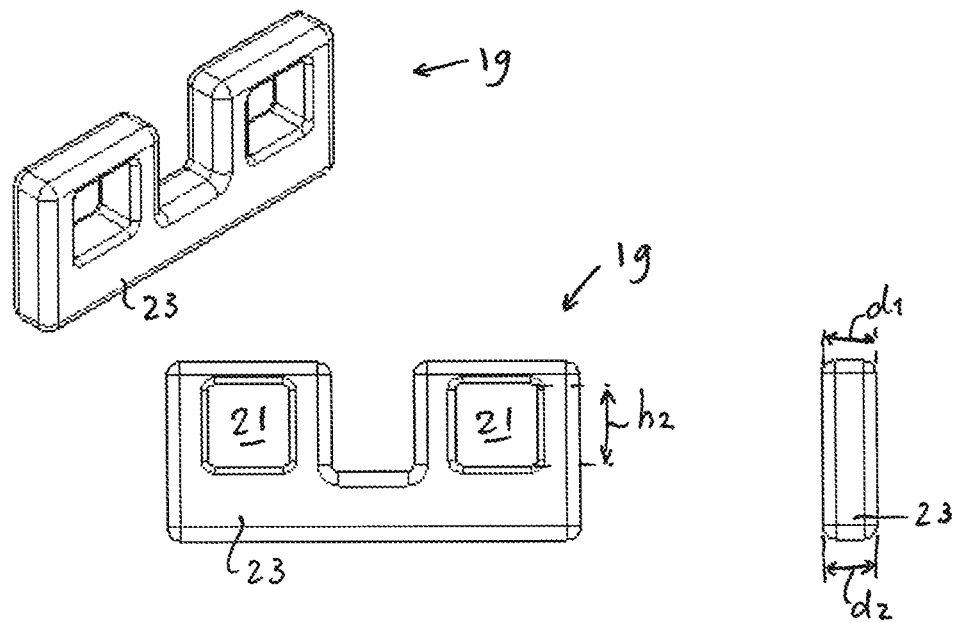
FIG. 2 shows isometric, front and side views of a component of the transmission element of FIG. 1.
Figure 3:
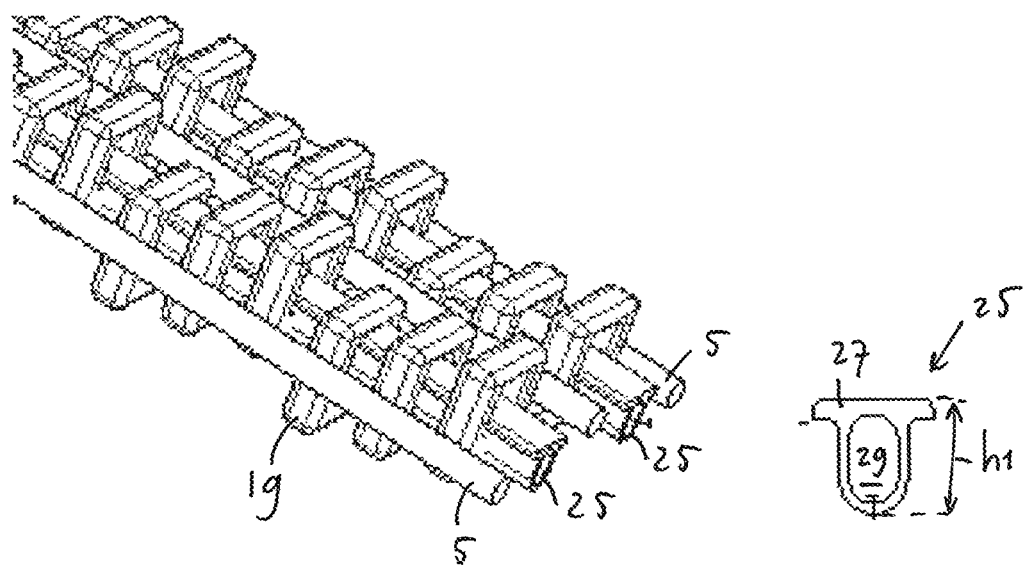
FIG. 3 is an isometric view of an assembly of components of the transmission element shown in FIG. 1.
Figure 4:
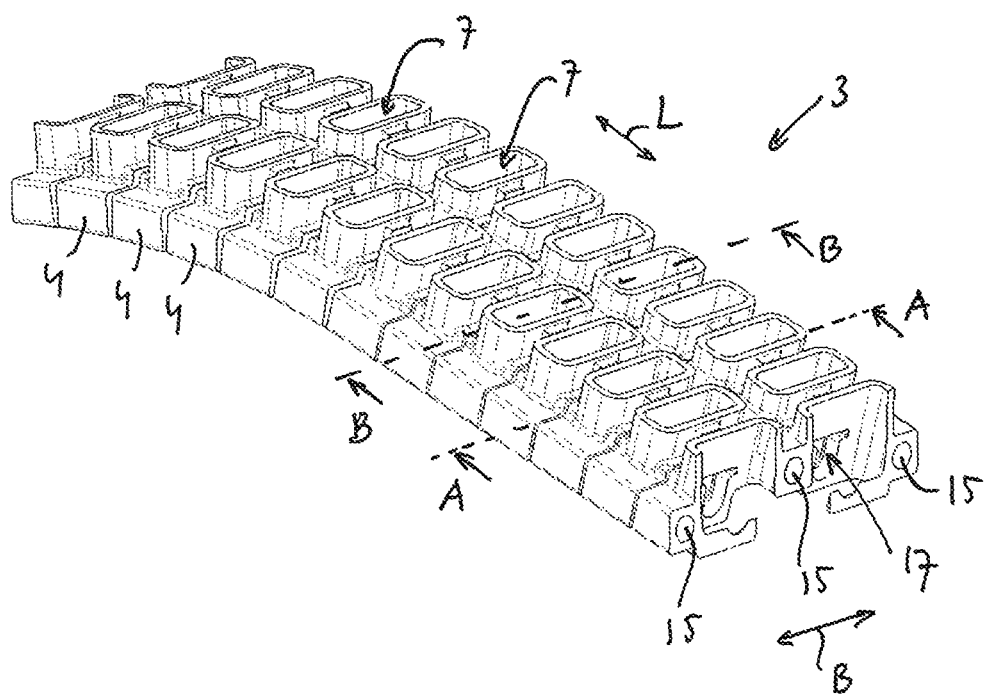
FIG. 4 is an isometric view of a further component of the transmission element shown in FIG. 1.
Figure 5:
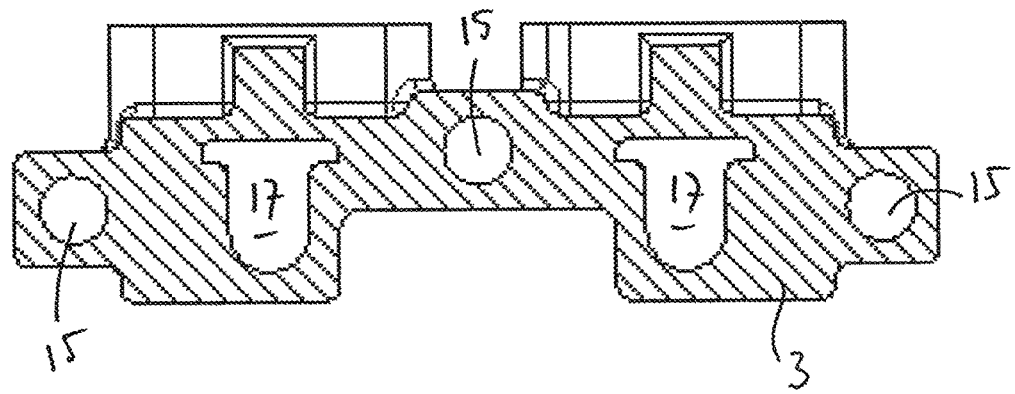
FIG. 5 shows cross-section A-A of FIG. 4.

The transmission element 1 shown in FIGS. 1 to 6 as preferred embodiment of a transmission element according to the invention has a carrier element 3. The carrier element 3 is an endless belt element manufactured from vulcanized rubber, a part of the overall length of which is shown in FIGS. 1 and 4. The carrier element 3 shown in FIG. 4 is constructed from individual successive interconnected carrier elements 4 which are fixedly connected to each other by means of vulcanization. A typical length of the transmission element, at least for application of the transmission element in a continuously variable transmission for vehicles such as automobiles, lies in the range of several tens of centimeters to about one and a half meters.

Provided in the carrier element 3 are endless cords 5 embodied as strengthening elements for the purpose of realizing a desired resistance to elongation of the carrier element 3, i.e. significantly increasing the resistance to elongation of the carrier element 3. The cords are manufactured from a composite material comprising for instance carbon fibres. The cords 5 are provided in the carrier element 3 in passages 15 provided on both longitudinal sides and centrally in the carrier element. Passages 15 are likewise endless.

During use of the transmission element 1 shown in FIG. 1 the underside 11, or inner side, of the transmission element 1, in a situation where the transmission element 1 is mounted in a transmission, is directed toward a pulley of the transmission. FIGS. 7 to 10 show simplified views of a transmission element wherein the inner side 11 is directed toward a contact element.

Figure 11:
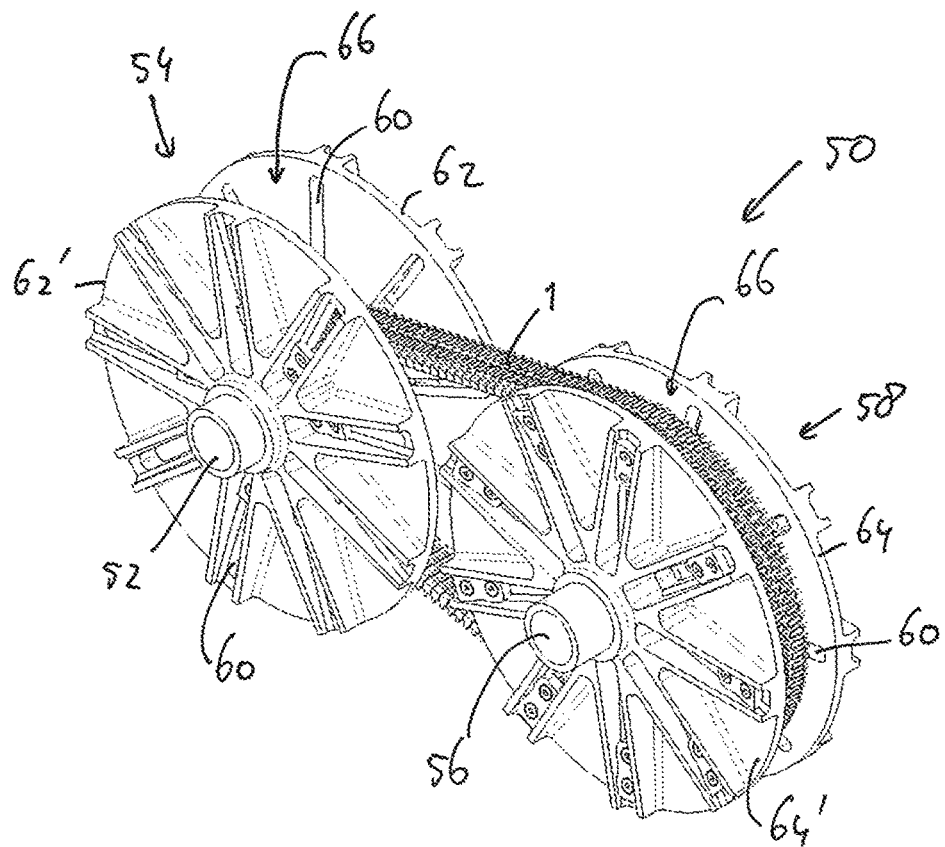
FIG. 11 is an isometric view of a preferred embodiment of a part of a transmission according to the invention with the transmission element shown in FIG. 1 therein.
Figure 12:
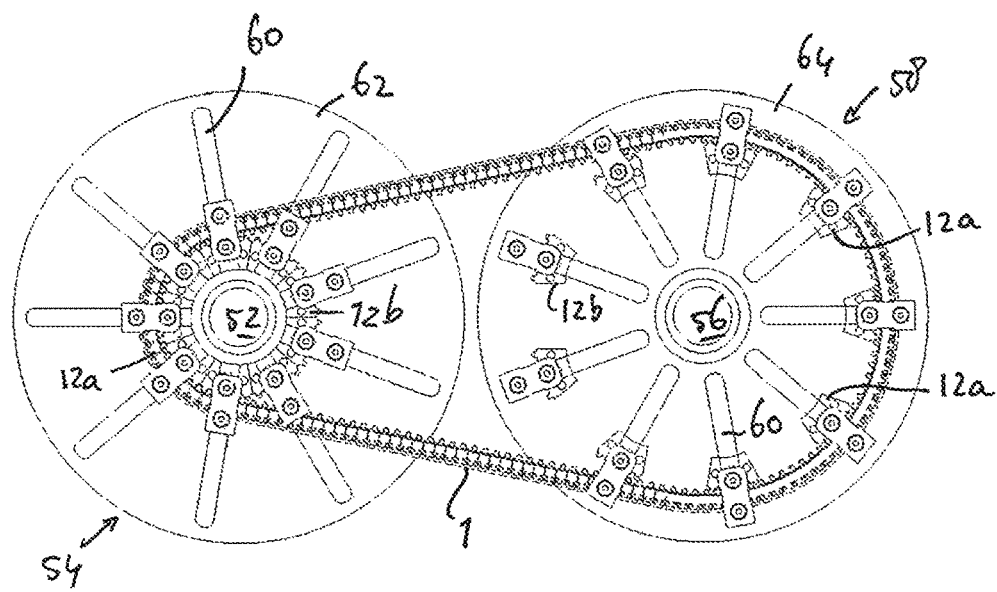
FIG. 12 is a partly cut-away side view of the part of a transmission shown in FIG. 11.

FIGS. 11 and 12 show a transmission 50 which is particularly suitable for co-action with the transmission element 1 as specified above and to be described in more detail below. The transmission 50 comprises a first pulley 54 rotatable about a first rotation axis 52 and a second pulley 58 rotatable about a second rotation axis 56. The transmission element 1 is trained round both the first pulley 54 and the second pulley 58. Drive force can thus be transmitted during operation from the first 54 to the second pulley 58, and thereby between the first shaft 52 and the second shaft 56. Both pulleys are constructed from two respective disc parts 62, 62' and 64, 64' with an intermediate space 66 therebetween in which the transmission element 1 is axially enclosed. For the sake of clarity in FIG. 12 a first 62', 64' of the two disc parts 62, 62', 64, 64' of pulleys 54 and 58 are omitted.

The first 54 and second pulley 58 are provided with contact elements 12a, 12b distributed around the rotation axis 52, 56 of the associated pulley 54, 58. The contact elements 12a, 12b determine a running radius r at which the transmission element 1 is trained around the associated pulley 54, 58. See also FIGS. 8 and 9. The contact elements 12a, 12b are identical. The reference numeral 12a is employed for contact elements which, at least in the situation according to the figures, are in contact with the transmission element 1, while reference numeral 12b is employed for contact elements which, at least in the situation according to the figures, are not in contact with the transmission element 1. Each of the contact elements 12a, 12b is provided on the outer side thereof facing toward the transmission element 1 with engaging elements which are provided at a regular pitch and which are formed in the embodiment shown in FIGS. 11 and 12 by teeth 30a-30e. The contact elements 12a, 12b are movable in radial direction of the pulley 54, 58 for the purpose of changing the running radius r1 of the pulley 54, 58. Arranged for this purpose in the pulley 54, 58 are radial slots 60 in which the contact elements 12a, 12b are slidably held. The transmission further comprises moving means (not shown) to enable movement of the contact elements 12a, 12b in the radial direction.

Figure 6:
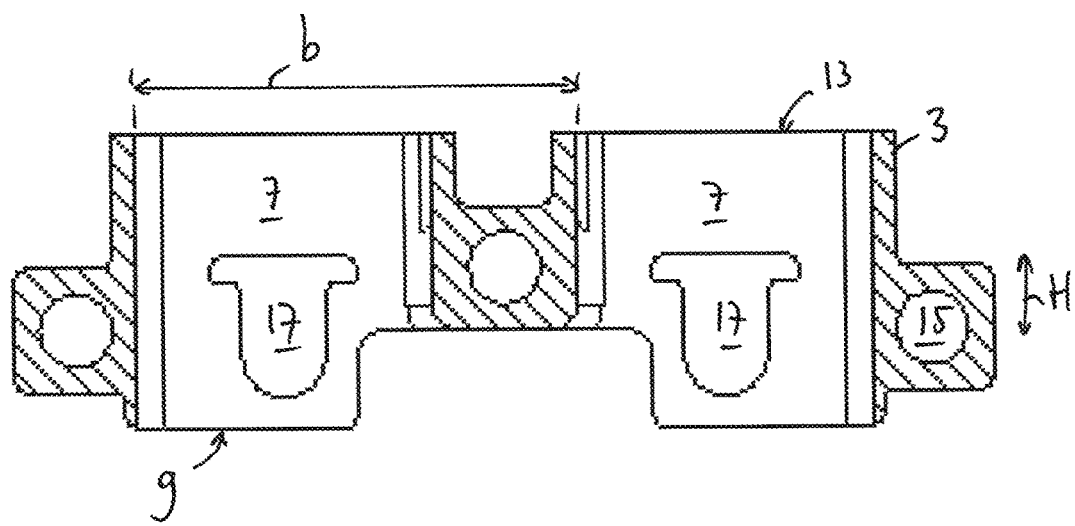
FIG. 6 shows cross-section B-B of FIG. 4.

Provided in the carrier element 3 are receiving spaces 7 which are further shown in FIG. 6. The receiving spaces 7 extend at right angles to the longitudinal direction L of the transmission element in a height direction H thereof. Upon contact between transmission element 1 and a pulley during operation of the transmission element 1 in a transmission the height direction H coincides with the radial direction of the pulley. Each of the receiving spaces 7 is provided on the underside 11 with an opening 9. In addition, the receiving spaces 7 are likewise provided in the shown embodiment with an opening on the upper side 13, i.e. the receiving spaces 7 are continuous. The receiving spaces 7 are provided in each case pairwise adjacently of each other in width direction B at a fixed mutual pitch a in the longitudinal direction. A receiving space and a further receiving space are thus provided adjacently of each other in each case at a regular pitch in longitudinal direction of the carrier element.

Engaging elements 19 are provided movably in the receiving spaces 7. The engaging elements 19 are provided with passages in the form of holes 21 and a tooth part 23. The engaging elements 19 are movable in the direction at right angles to the longitudinal direction L of the transmission element 1 between an active position, wherein the tooth part 23 protrudes in large part below the underside 11 of the carrier element 3, or protrudes on the inner side out of the opening 9, and a passive position wherein the tooth part 23 does not protrude, or at least only protrudes in small part, below the underside 11 of the carrier element 3. The holes 21 are located wholly in the receiving spaces 7 in both the active and passive positions. The tooth part 23 forms an engagement for the pulley wherein the thickness d2 of the tooth part 23 corresponds to the engaging profile of the pulley, or at least a contact element thereof. The thickness d1 of the engaging elements close to the holes 21 corresponds to the dimension D of the receiving spaces 7 so as to obtain a sliding contact between engaging elements 19 and receiving spaces 7. In the shown embodiment the dimensions d1 and d2 are equal. The transmission element 1 with the engaging elements 19 thus functions in the active position thereof as a toothed belt.

The receiving spaces 7 are provided in longitudinal direction L in the carrier element 3 at a regular pitch a and provided in the width direction B in the carrier element 3 at a distance b indicated in FIG. 6. The adjacent receiving spaces 7 in longitudinal direction L are mutually connected by means of a passage 17. Provided in the passage 17 is a spring element 25 which passes through the holes 21 of the engaging elements 19. The spring element 25 is embodied as a hollow endless chord with a thickened portion 27 for the purpose of realizing a form closure in passages 17. The height h2 of the holes 21 of the engaging elements 19 are substantially equal to the height h1 of the spring element 25. The inner space 29 of the cord 25 is filled with a gas, such as for instance air or nitrogen, for the purpose of obtaining the desired spring elasticity. The inner space 29 can alternatively be filled with a liquid such as oil so as to obtain a greater spring elasticity. The spring element 25 is manufactured from a synthetic silicone rubber, preferably reinforced with a composite material.

Figure 7:
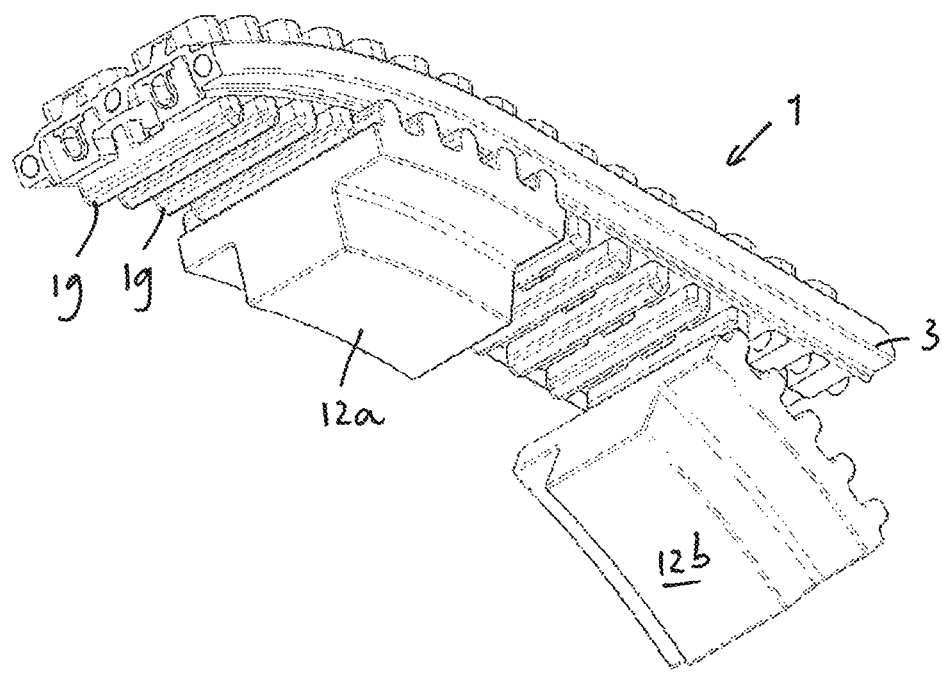
FIG. 7 is an isometric view of a part of the preferred embodiment of a transmission element according to the present invention and a part of a pulley.
Figure 8:
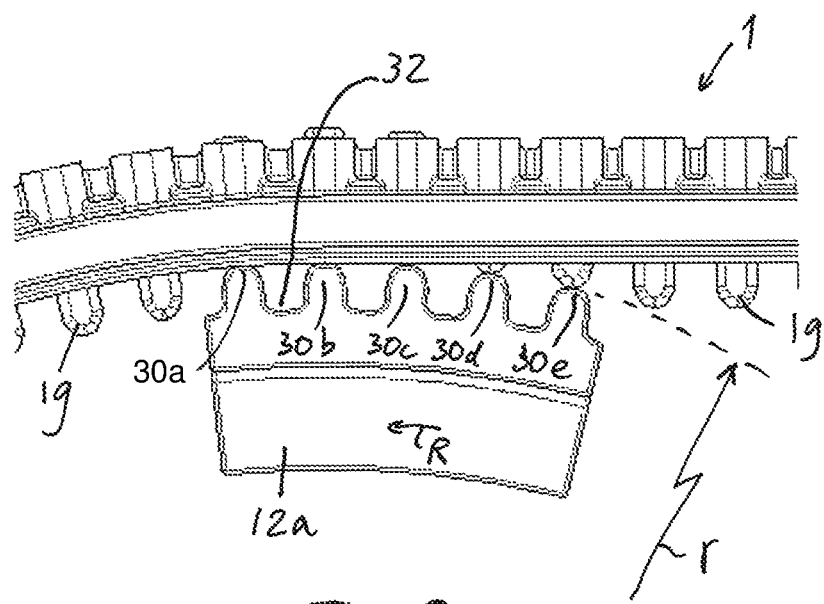
FIGS. 8, 9 and 10 are side views of the preferred embodiment of a transmission element according to the present invention and a part of a pulley in different respective modes of operation.
Figure 9:
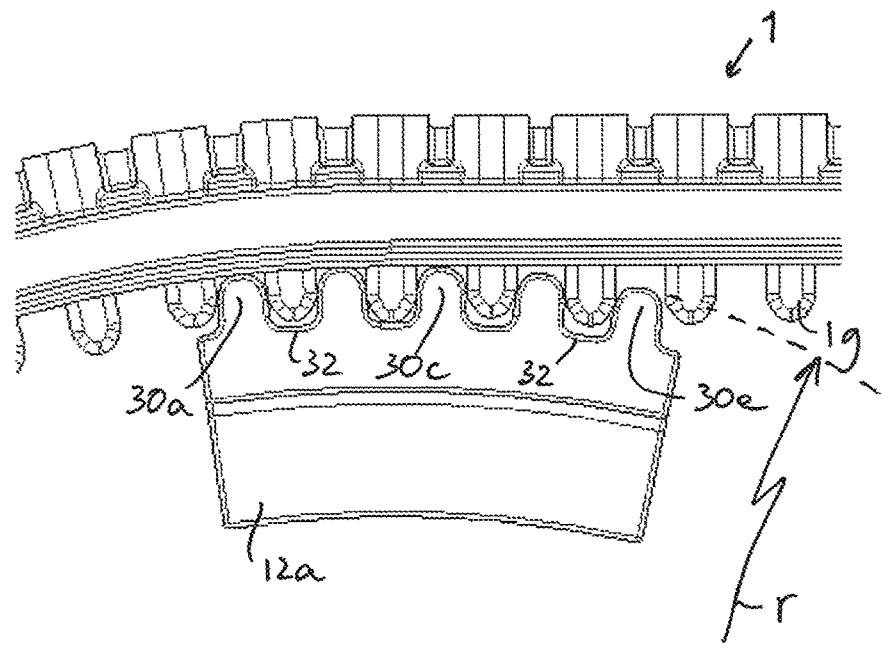
Figure 10:
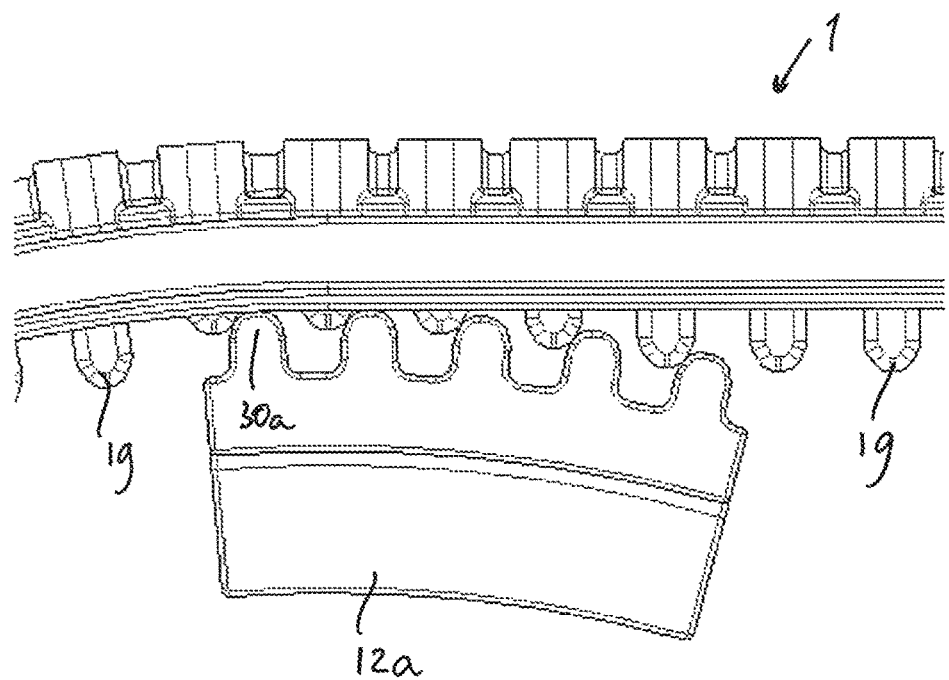

FIG. 7 shows a transmission element 1 wherein a part of the underside 11 of the transmission element 1 lies against a contact element 12a. Also shown in this figure is a contact element 12b which is identical to the contact element 12a. In the case of a rotation direction R as indicated in FIGS. 8-10 the contact element 12b comes into contact with the underside 11 of the transmission element 1 in order to thus guarantee, with a number of such contact elements provided at a regular spacing on the periphery of the pulley, a continuous engagement between the transmission element 1 and the pulley. The contact elements are provided here at a radius r relative to a central axis of the associated pulley. See FIGS. 8 and 9. This radius r is the same for all contact elements of the pulley, but is variably adjustable. The engaging elements 19 present in a part of the transmission element 1 which does not lie against the contact element 12a are in the active position. The position of the engaging elements 19 at the location of the contact element 12a depends on the relative positioning of the contact element 12a and the engaging elements 19.

Shown in FIG. 8 is a situation wherein the engaging garments 19 are in contact at the location of the contact element 12a with the tops of the teeth 30a, 30b, 30c and 30d.

The engaging elements at the location of the teeth 30a, 30b and 30c are in the passive position here. As the transmission element runs onto the pulley, the engaging elements at the location of the teeth 30d and 30c are in a position between the active and passive position. It is noted that in the situation shown in FIG. 8 at least one tooth of a contact element (not shown) of the same pulley is in engagement with an engaging element 19 of the transmission element 1. Because the engaging elements 19 at the location of contact element 12a have moved to the passive position thereof, the radius of the transmission element, which is defined by the radial position of the contact elements on the pulley, is maintained.

FIG. 9 shows a situation in which all teeth 30a, 30b, 30c, 30d of the contact element 12a are in engagement with the engaging elements 19 of the pulley 1. The engaging elements 19 are in the active position here, wherein a maximum engagement is realized between transmission element 1 and the pulley.

FIG. 10 shows a situation wherein all teeth 30a, 30b, 30c, 30d of the contact element 12a are likewise in contact with engaging elements 19 of the pulley and therefore engage to some, albeit limited, extent on the engaging elements 19 for the purpose of transmitting a drive force. In this situation the engaging elements lie between the active and the passive position.

The invention claimed is:

1. A transmission element for a transmission including at least two pulleys, configured to be trained in a mounted arrangement around the at least two pulleys of the transmission in order to thus enable transmission of drive force during operation from a first to a second of the at least two pulleys, the transmission element comprising:
   an elongate flexible endless carrier element provided at regular pitch in a longitudinal direction thereof with a number of receiving spaces, wherein each of the number of receiving spaces is provided with an opening on an inner side of the carrier element facing in operation toward a pulley, wherein the carrier element has a passage extending through the number of receiving spaces in the longitudinal direction of the carrier element;
   a number of engaging elements which are each received in a receiving space of the number of receiving spaces for movement substantially at right angles to the longitudinal direction between an active position and a passive position and which in the active position protrude further inward than in the passive position and at least out of the opening of this receiving space so as to be able to engage in the active position with a pulley of the at least two pulleys of the transmission, and wherein each of the number of engaging elements is provided with a passage at least partially in line with the passage in the carrier element;
   an endless spring element extending through the passage in the carrier element and through the passage of each of the number of engaging elements,
wherein the spring element is configured to provide, for each of the number of engaging elements, resistance from spring action of the spring element during movement of the respective engaging element from the active position in the direction of the passive position.

2. The transmission element according to claim 1, wherein the carrier element is provided at regular pitch in the longitudinal direction thereof with a number of further receiving spaces, wherein each of the number of further receiving spaces is provided with a further opening on the inner side of the carrier element facing toward the pulley during use, wherein in a transverse direction of the carrier element transversely of the longitudinal direction of the carrier element a receiving space and a further receiving space are provided adjacently of each other in each case, wherein each of the number of respective engaging elements is received in a receiving space of the number of receiving spaces and the further receiving space of the number of further receiving spaces provided adjacently thereof.

3. The transmission element according to claim 2, wherein the carrier element has a further passage extending in the carrier element through the number of further receiving spaces in the longitudinal direction of the carrier element, and wherein each of the number of engaging elements is provided with a further passage which is at least partially in line with the further passage in the carrier element, the carrier element further comprising a further endless spring element which extends through the further passage in the carrier element and through each of the further passages of the respective engaging elements, wherein the further spring element is configured to provide, for each of the number of engaging elements, resistance from spring action of the spring element during movement of the respective engaging element from the active position in the direction of the passive position.

4. The transmission element according to claim 1, further comprising an endless strengthening element, configured to increase the resistance to elongation of the carrier element, is provided in the carrier element in the longitudinal direction of the carrier element.

5. The transmission element according to claim 3, wherein the spring element and/or the further spring element is formed as a hollow cord having a cavity filled with a fluid.

6. The transmission element according to claim 1, wherein the carrier element is formed in the longitudinal direction by a number of successive interconnected carrier elements.

7. The transmission element according to claim 6, wherein the carrier element is manufactured from a material comprising rubber.

8. The transmission element according to claim 7, wherein the successive interconnected carrier elements are vulcanized to each other in a connected state.

9. The transmission element according to claim 3, wherein the passage and/or the further passage of each of the number of engaging elements is a through-hole.

10. A transmission, comprising a transmission element according to claim 1, including a first pulley rotatable about a first rotation axis and a second pulley rotatable about a second rotation axis, wherein the transmission element is trained round both the first pulley and the second pulley so as to thus enable transmission of drive force from the first pulley to the second during operation,
   at least one of the first and second pulleys comprising:
      a number of contact elements for contact with the transmission element which are distributed around the rotation axis of the associated pulley, which contact elements define a running radius at which the transmission element is trained round the associated pulley, wherein each of the number of contact elements is provided on an outer side thereof facing toward the transmission element with a plurality of engaging elements provided at a regular pitch relative to each other for engaging with one or more engaging elements lying in the active position thereof of the number of engaging elements of the transmission element during operation; and moving means for moving the contact elements reciprocally in a radial direction.

\* \* \* \* \*